US011353965B2

(12) United States Patent
Harrison et al.

(10) Patent No.: US 11,353,965 B2
(45) Date of Patent: Jun. 7, 2022

(54) SYSTEM FOR ENABLING RICH CONTEXTUAL APPLICATIONS FOR INTERFACE-POOR SMART DEVICES

(71) Applicant: CARNEGIE MELLON UNIVERSITY, Pittsburgh, PA (US)

(72) Inventors: Christopher Harrison, Pittsburgh, PA (US); Robert Xiao, Pittsburgh, PA (US); Gierad Laput, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 0 days.

(21) Appl. No.: 16/094,973

(22) PCT Filed: Apr. 21, 2017

(86) PCT No.: PCT/US2017/029005
§ 371 (c)(1),
(2) Date: Oct. 19, 2018

(87) PCT Pub. No.: WO2017/185068
PCT Pub. Date: Oct. 26, 2017

(65) Prior Publication Data
US 2019/0101992 A1    Apr. 4, 2019

Related U.S. Application Data

(60) Provisional application No. 62/391,170, filed on Apr. 21, 2016.

(51) Int. Cl.
*G06F 3/03* (2006.01)
*G06F 3/0484* (2022.01)
(Continued)

(52) U.S. Cl.
CPC .............. *G06F 3/03* (2013.01); *G06F 3/0484* (2013.01); *G06F 3/04817* (2013.01);
(Continued)

(58) Field of Classification Search
CPC combination set(s) only.
See application file for complete search history.

(56) References Cited

U.S. PATENT DOCUMENTS

2005/0169212 A1 * 8/2005  Doi ........................ G06F 3/038
                                                        370/328
2012/0139690 A1 * 6/2012  Gupta .................... H04W 4/80
                                                        340/5.1
(Continued)

OTHER PUBLICATIONS

International Search Report and Written Opinion of the International Searching Authority for PCT Application PCT/US2017/029005 dated Jul. 10, 2017.
(Continued)

*Primary Examiner* — Nitin Patel
*Assistant Examiner* — Amen W Bogale
(74) *Attorney, Agent, or Firm* — Michael G. Monyok

(57) ABSTRACT

Disclosed herein is a method and system a system that enables users to simply tap their smartphone or other electronic device to an object to discover and rapidly utilize contextual functionality. As described herein, the system and method provide for recognition of physical contact with uninstrumented objects, and summons object-specific interfaces.

14 Claims, 13 Drawing Sheets

(51) Int. Cl.
  *G06F 3/04817* (2022.01)
  *G06V 30/142* (2022.01)
  *G06K 9/00* (2022.01)
  *G06V 10/22* (2022.01)
(52) U.S. Cl.
  CPC ....... *G06K 9/00496* (2013.01); *G06V 10/235* (2022.01); *G06V 30/142* (2022.01)

(56) References Cited

U.S. PATENT DOCUMENTS

| | | | | |
|---|---|---|---|---|
| 2012/0146918 A1* | 6/2012 | Kreiner | ................... | G08C 17/00 345/173 |
| 2012/0190455 A1* | 7/2012 | Briggs | ............. | G06K 19/06037 463/42 |
| 2012/0224743 A1 | 9/2012 | Rodriguez et al. | | |
| 2013/0293734 A1 | 11/2013 | Fan et al. | | |
| 2015/0023602 A1 | 1/2015 | Wnuk et al. | | |
| 2015/0331711 A1* | 11/2015 | Huang | .................... | G06F 9/542 719/320 |
| 2015/0339031 A1* | 11/2015 | Zeinstra | ................. | B60K 37/06 715/747 |
| 2016/0198001 A1* | 7/2016 | Um | ........................ | H04L 67/18 709/205 |
| 2017/0124816 A1* | 5/2017 | Yang | .................... | H04M 1/725 |
| 2017/0270198 A1* | 9/2017 | Sample | ................ | G06F 16/211 |
| 2017/0344769 A1* | 11/2017 | Mannan | ............. | G06K 7/10366 |

OTHER PUBLICATIONS

Laput, G. "Em-sense: Touch recognition of uninstrumented, electrical and electromechanical objects." In Proceedings of the 28th Annual ACM Symposium on User Interface Software & Technology, pp. 157-166. ACM, 2015.

* cited by examiner

SYSTEM FOR ENABLING RICH CONTEXTUAL APPLICATIONS FOR INTERFACE-POOR SMART DEVICES

CROSS-REFERENCE TO RELATED APPLICATIONS

This application claims the benefit under 35 U.S.C. § 119 of Provisional Application Ser. No. 62/391,170, filed Apr. 21, 2016, which is incorporated herein by reference.

STATEMENT REGARDING FEDERALLY SPONSORED RESEARCH

Not applicable.

BACKGROUND OF THE INVENTION

The invention relates generally to object recognition. More specifically, the invention relates to a method of using an electronic device to identify and interact with a variety of objects typically encountered throughout a person's day without modifying or tagging the objects.

We are surrounded by an ever-growing ecosystem of connected and computationally-enhanced appliances and objects, from smart thermostats and light bulbs, to coffee makers and refrigerators. The much-lauded Internet of Things (IoT) revolution predicts billions of such devices in use within the next few years. Despite offering sophisticated functionality, most IoT devices provide only rudimentary on-device controls. The lack of user-friendly controls is because (1) it is expensive to include large touchscreen displays, for example, on low-cost, mass-market hardware, and (2) it is challenging to provide a full-featured user experience in a small form factor. Instead, most IoT appliances rely on users to launch a special-purpose application or browse to a specific website on their smartphone or tablet to interact with the object.

With an increasing number of connected IoT devices, the manual launching approach does not scale. In other words, the user experience suffers if a user must search through scores of applications to dim the lights in the living room or find something to watch on TV. To overcome this problem, an instant and effortless way to automatically summon rich user interface controls, as well as expose appliance-specific functionality within existing smartphone applications in a contextually relevant manner, should be provided.

In one approach to recognize appliances on-touch, Laput et al. proposed in EM-Sense a smartwatch that detected electro-magnetic emissions of grasped electrical and electromechanical objects. Most powered objects emit some amount of electro-magnetic radiation, which is fairly unique to the object and can be exploited for classification purposes. In the approach proposed by Laput, the user's body acts as an antenna to receive the electro-magnetic signals emitted by the object. The received signals are then transmitted to a laptop, which performs an analysis to classify the object. Notably, this approach requires no modification or instrumentation of the object, and can therefore work "out of the box" with already-deployed devices. However, the EM-Sense approach did not propose a method of controlling the touched object and is a bulky implementation requiring the use of a laptop.

Various others have proposed techniques of using mobile devices to control appliances. An early system by Hodes et al. allowed users to control multiple pieces of lecture hall equipment from a single wireless laptop, though users still had to manually select the desired device from a graphical map. To alleviate this manual selection process, later work has considered a bevy of technical approaches to automatically select and recognize appliances from mobile devices, including RFID tags, fiducial tags, near-field communication, laser pointers, handheld projectors, and personal area networks. While these systems allow users to select appliances by tapping or pointing at the device, they require appliances (or the environment) to be specially instrumented with tags or sensors working in concert with custom emitters or sensors on the mobile device.

Other systems provide object recognition and do not require instrumentation of the appliance. For example, one system uses a smartphone's camera (combined with machine learning) to classify objects in the environment and overlay a suitable control interface. This system demonstrated classification between eight different objects, although no formal accuracy evaluation was provided. As another example, one system uses a smartphone camera in conjunction with a continually-updated database of appliance images to automatically classify appliances and summon appropriate interfaces. While these systems are capable of recognizing objects, accuracy is dependent on the quality of the image obtained by the user. Further, the image capture process can be cumbersome and time consuming, a problem previously discussed with the ever-expanding IoT.

It would therefore be advantageous to develop a method and system for object recognition and control that is compact, inexpensive, and runs on a low-powered embedded processor. Lastly, the method and system should demonstrate improved ad hoc appliance recognition accuracy, which makes integration into consumer devices significantly more feasible.

BRIEF SUMMARY

According to embodiments of the present invention is a system and method for recognizing and interacting with an object using an electronic device. In one embodiment, the system enables a user to simply tap an electronic device, such as a smartphone, to an object to discover and rapidly utilize contextual functionality. Once an object is touched by the user and recognized by the system, the object manufacturer's application (App.) can be automatically launched on the electronic device. For example, touching a smartphone to a thermostat launches the thermostat's configuration App.

In another example, the electronic device can expose small widgets that allow the running smartphone application to perform actions on the touched object. These widgets are referred to herein as contextual charms. For example, when reading a PDF on a smartphone, the action of touching the phone to a printer will reveal an on-screen print button (i.e. contextual charm). By tapping the contextual charm, the PDF will be wirelessly sent to the printer and printed.

DETAILED DESCRIPTION

According to embodiments of the present invention is a system and method for recognizing and interacting with an object 130 that emits electro-magnetic (EM) radiation. Examples of such object 130 can include, but is not limited to, printers, thermostats, smart light bulbs, computers, and coffee makers.

Figure 1:
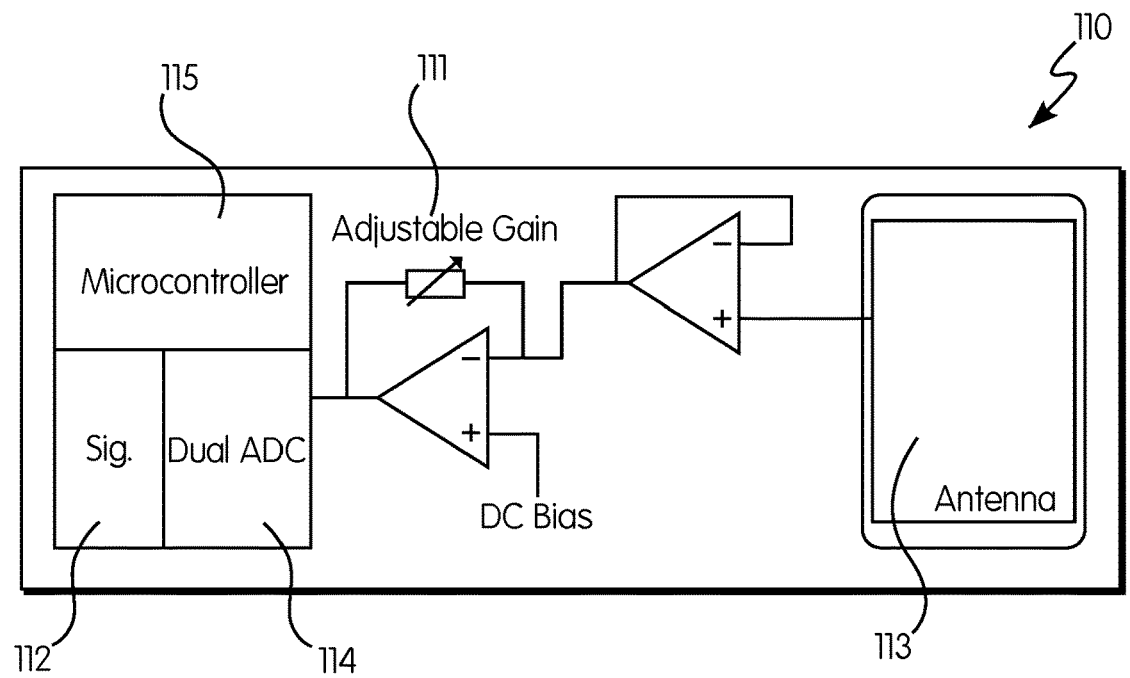
FIG. 1 is a block diagram of the system according to one embodiment.

In one embodiment, as shown in FIG. 1, the system comprises an electronic device 110 used to receive an EM signal, process the signal, and perform classification of the object 130 emitting the signal. The electronic device 110, according to one embodiment, comprises an antenna 113 for receiving the signal from the object 130, an amplifier 111, an analog-to-digital converter 114, and a microcontroller 115. The microcontroller can run various applications and software, such as a signal classification engine 112.

The electronic device 110, such as a smartphone according to one embodiment, runs the real-time signal classification engine 112 to classify the object's EM signal received by the antenna 113. The classification engine 112 may comprise software run on the controller 115, or, alternatively physical hardware. In one embodiment, the components are all powered off of the smartphone's battery, creating a fully self-contained system.

Figure 2:
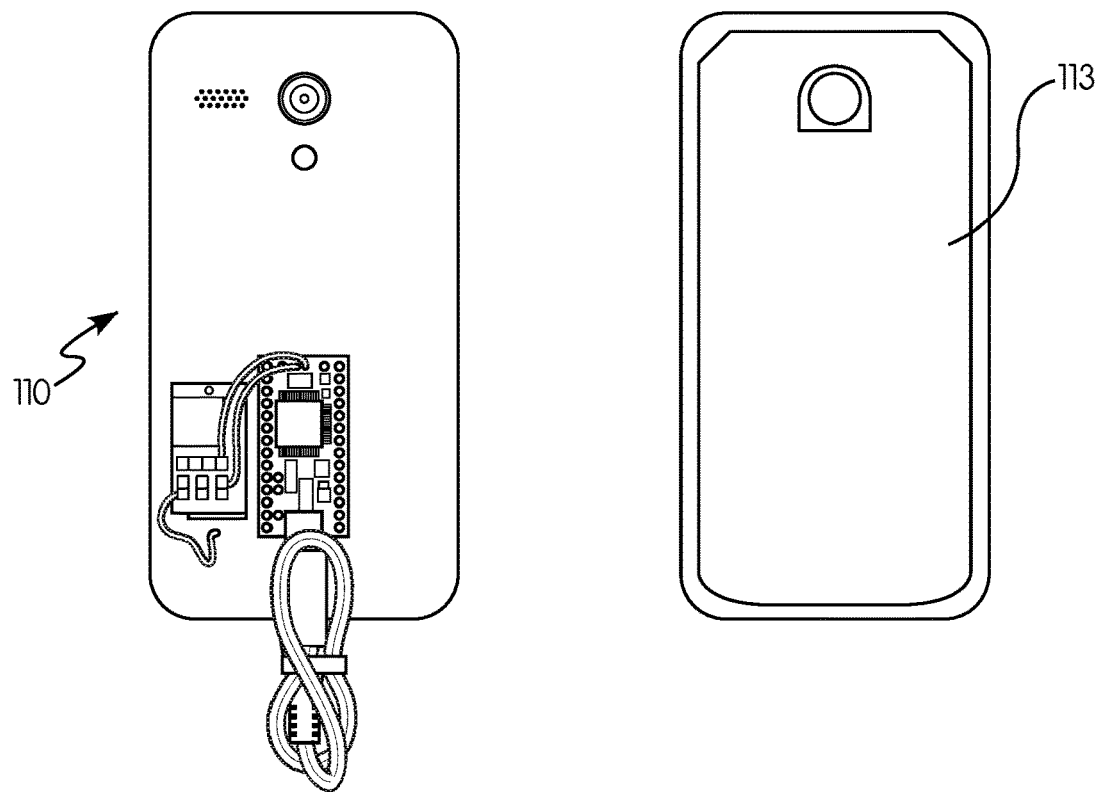
FIG. 2 depicts an example embodiment of the electronic device, with the antenna shown on the back cover of the device.

By way of further example, in one embodiment the electronic device 110 comprises an instrumented Moto G XT1031 (a mid-tier Android phone). This phone has a 1.2 GHz quad-core Snapdragon processor and 1 GB of RAM. It features a removable plastic rear cover, which can be inlaid with copper tape to serve as an antenna 113 for receiving an EM signal from an object 130. This particular embodiment is shown in FIG. 2. In alternative embodiments, it is possible to utilize an existing antenna in the phone or to utilize the phone's internal chassis (which is often made of magnesium or aluminum) as the antenna 113.

In this example embodiment, the antenna 113 is connected to a 50× amplifier circuit 111 compactly mounted on a custom printed circuit board. This circuit amplifies the weak EM signals received by the antenna 113 and adds a 1.6 V DC bias to move the signal to the 0-3.3 V range, which is compatible with certain models of an analog-to-digital converter (ADC) 114. The amplified signal is then sampled by a system-on-chip (SoC) microcontroller (MK20DX256VLH7) 115, which incorporates an ARM Cortex-M4 processor overclocked to run at 96 MHz and dual ADC's 114.

The amplified and voltage-biased analog signal is sampled with 12-bit resolution at 4.36 MHz. This high sampling rate is achieved by running both of the SoC's ADCs on the same pin, with their conversion trigger signals offset in time to achieve interleaved sample conversion. The system uses the SoC's direct memory access (DMA) unit to copy the ADC samples to main memory, reducing processor overhead.

The first stage of data processing takes place on the SoC itself. The processor continuously runs 1024-sample discrete Fourier transforms (DFTs) on the input signal to extract the frequency spectra. Only the magnitude of the resulting complex-valued spectra is used to obtain amplitude spectra. Using an optimized, 16-bit fixed-point real-valued DFT, the processor performs~1000 transforms per second. To improve the stability of the frequency domain data, the frequency-wise maximum over a running 40 ms window is tracked. A running maximum is used, rather than an average in order to capture the transient signals typical of digital devices.

To recognize the captured signal, the signal classification engine 112 runs on the electronic device 110. In the example embodiment described above, the signal classification engine 112 runs on the Android phone as a background service. In certain embodiments, the basic implementation of the signal classification engine 112 is similar to the approach described in EM-Sense. In the EM-Sense implementation, background noise is removed from the signal to capture a frequency spectrum of the extracted EM signal. For each spectrum captured by the embedded processor, a set of 699 features are extracted: the 512-element amplitude spectrum, the indices of the minimum and maximum spectrum elements, the root-mean-square (RMS) measurement, the mean and standard deviation of the spectrum, and pair-wise band ratios. In implementations where there are limited computational resources on the electronic device 110, features over the 1st or 2nd derivatives and the 2nd-order FFT are not computed.

Next, the features are fed to an ensemble of 153 binary linear-kernel support vector machine (SVM) classifiers, one for each possible pairing of the 18 output classes. The ensemble's output is determined through plurality voting. The entire classification process, including feature calculation, takes about 45 ms. In one embodiment, the Weka machine learning toolkit (modified to run on Android) is used to perform classification on the phone.

Finally, the classification is stabilized by outputting the most common classification amongst a window of the last 20 ensemble outputs. This voting scheme ensures that spurious or intermittent electrical signals do not result in errant classifications. In particular, without voting, "intermediate" signatures produced while the electronic device 110 moves towards an object 130 could result in incorrect classifications. This voting scheme introduces around 450 ms of latency into the pipeline, which is still acceptable for interactive applications. Once an object 130 is recognized, the electronic device can launch the interaction controls, such as a contextual charm 120.

Figure 3:
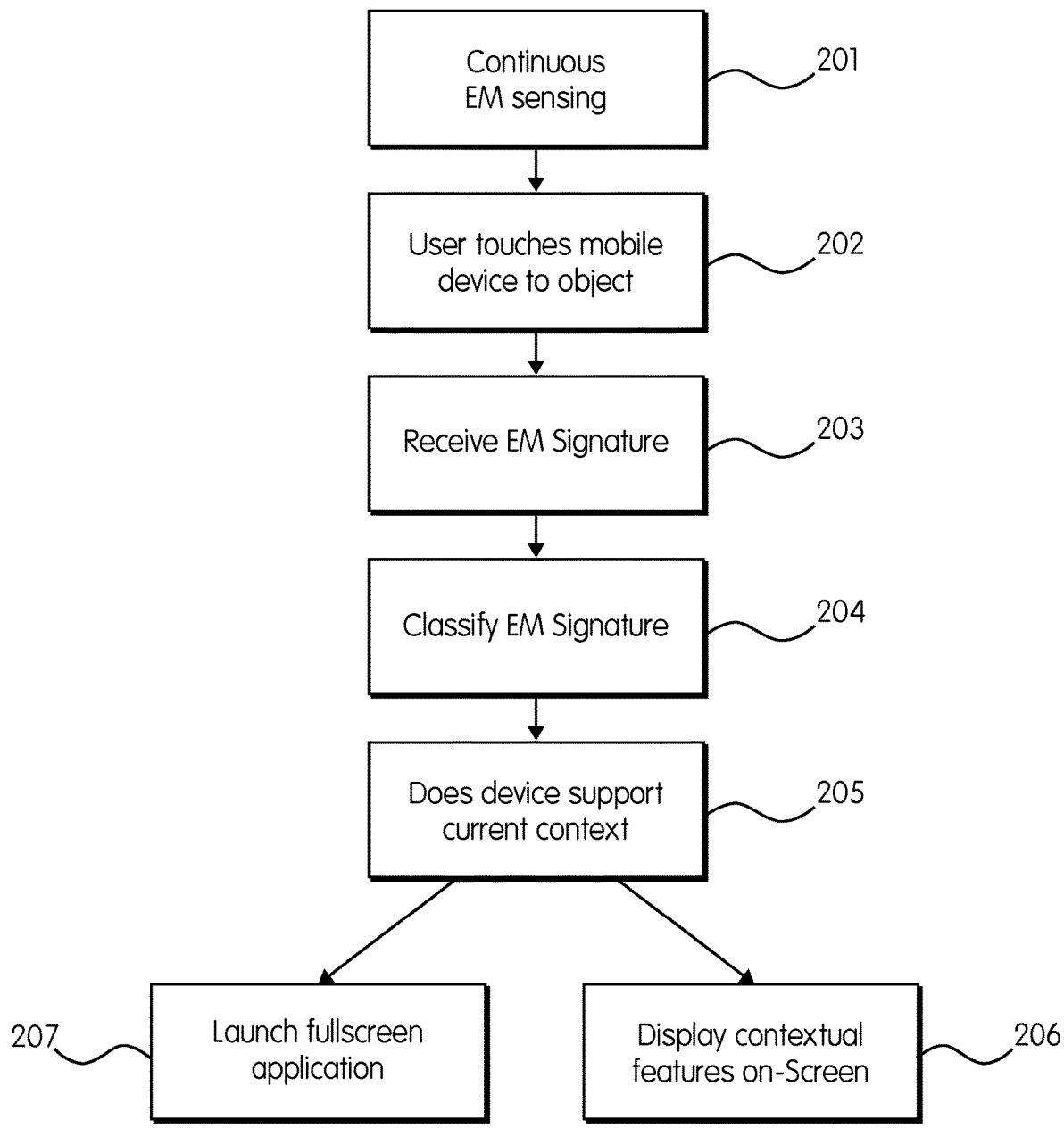
FIG. 3 is a flow diagram of the method of the present invention, according to one embodiment.

FIG. 3 is a flowchart depicting the method of object 130 recognition, according to an embodiment of the present invention. At step 201, the system conducts continuous EM sensing, which can provide a background EM signal used in some classification techniques. At step 202, a user touches the electronic device 110 (or mobile device) to an object 130. Next, at step 203, the antenna 113 of the electronic device 110 receives the EM signal from the object 130. Once received, the EM signal is analyzed by the signal classification engine 112 at step 204 in order to classify the object 130. The electronic device then determines, at step 205, if the device supports contextual interaction. If so, a contextual charm 120 is provided at step 206. If context is not supported by the object 130, at step 207 a full screen application is launched on the user interface 116, such as a touchscreen, on the electronic device 110.

Figure 4:
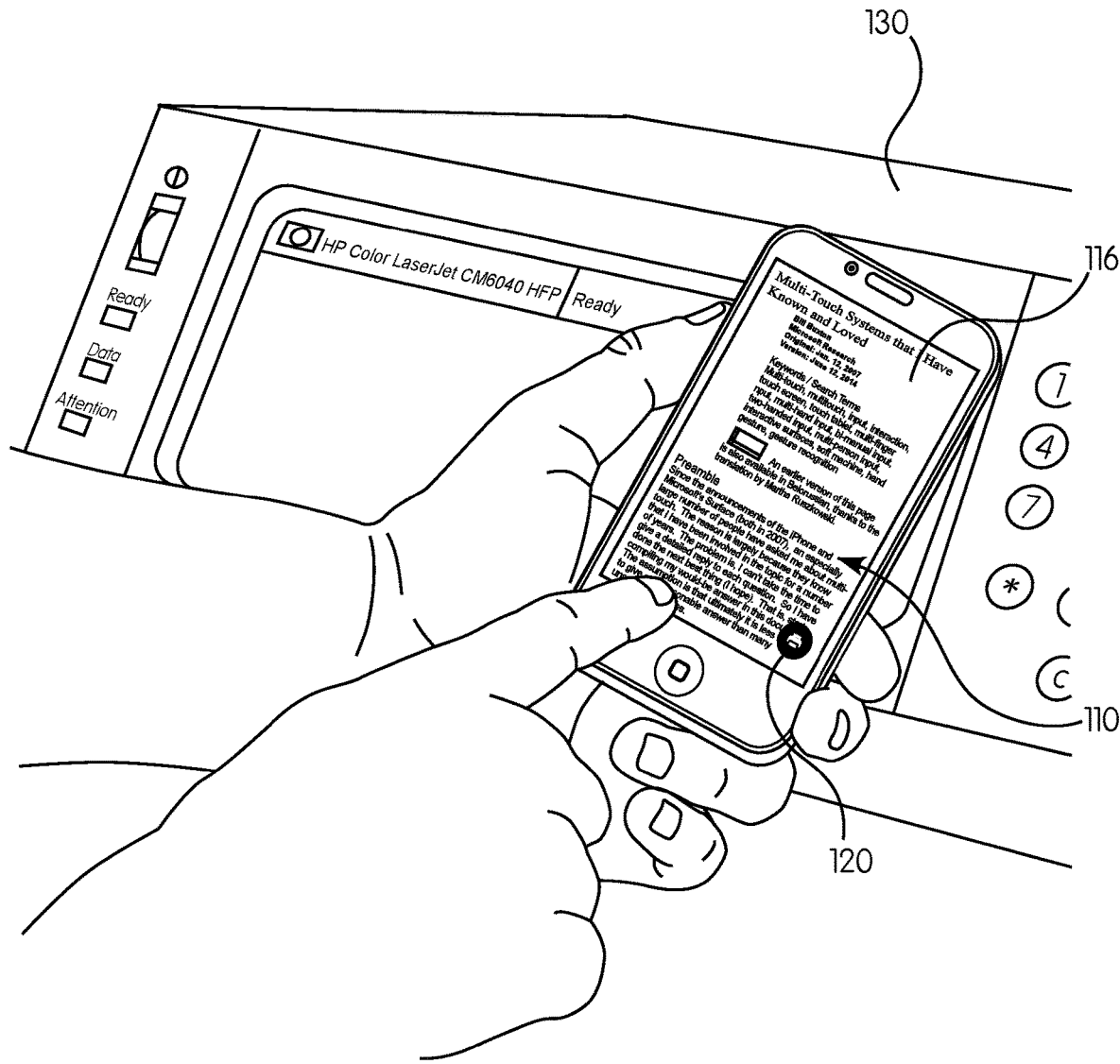
FIG. 4 shows an example of a "Print Document" contextual charm.

A contextual charm 120 may comprise a small button or icon that appears on a display or user interface 116 of the electronic device 110 when the electronic device 110 touches a supported object 130. FIG. 4 is an example of a charm displayed on the screen 116 of a smartphone 110, where a document on the phone is being sent to a printer. The contextual charms 120 relate to both the context of the running App. and the touched object 130. For example, the charms 120 may trigger specific device-to-object actions, according to one embodiment, expressed as verb-object pairs: "print document", "copy text", "scan document", "cast audio", and so on. The charm application framework predefines several verbs and object types, and leaves room for future expansion.

Referring again to the example embodiment described above, the charm service runs as a background Android service alongside the signal classification engine 112. In alternative embodiments, the charm service is implemented by the controller 115. To coordinate the contextual charm 120 functionality with the object, object drivers may communicate the set of supported actions to the electronic device 110. For example, a printer driver can register the "print document" action on all supported printer models.

When an object's EM signature is detected, the charm service matches the object's supported actions to available App. actions, then informs the application that new contextual actions are available. For example, if an App. for a printer allows remote printing, a "print" charm 120 can be shown on the user interface 116 of the electronic device 110. Within the App., selecting an action dispatches an "execute" command to the service, which in turn dispatches the verb and associated object data to the object's appliance driver (e.g. a Media-Router instance to implement casting of an audio file, or a backend printing driver to handle a document file). In this way, the charm service abstracts physical objects into receivers for application actions, allowing application developers to easily target arbitrary devices without needing to know specific device details.

It is envisioned that future smart appliance applications would register their device's EM signature and a set of verbs with the charm system service upon installation, which would enable existing apps to immediately take advantage of the hardware devices in a user's environment. This is analogous to the current paradigm of applications registering Android "share" handlers to support system-wide sharing of content to e.g., social media.

Figure 5A:
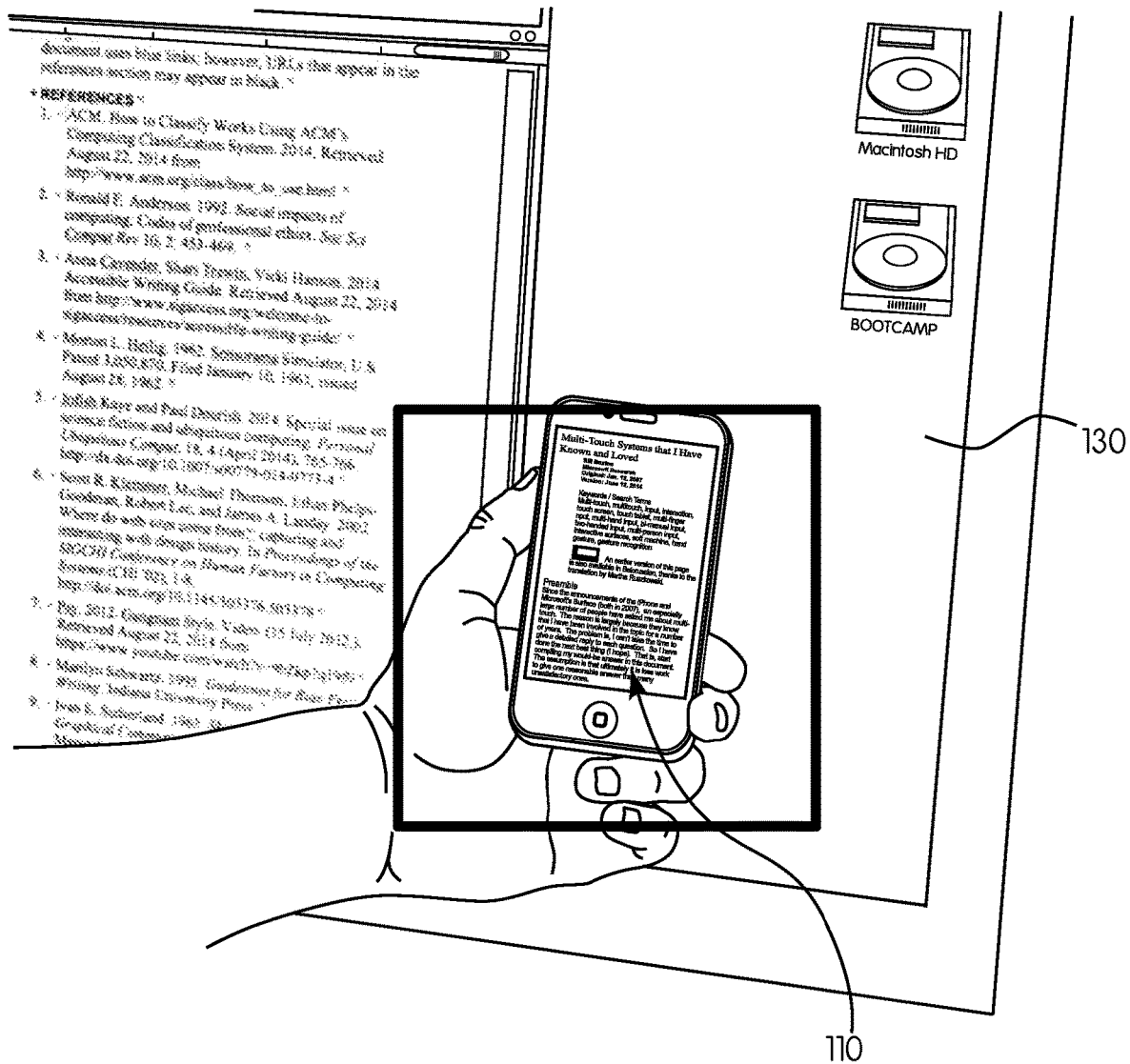
FIGS. 5A-5D show an example "Send Document" contextual charm.
Figure 5B:
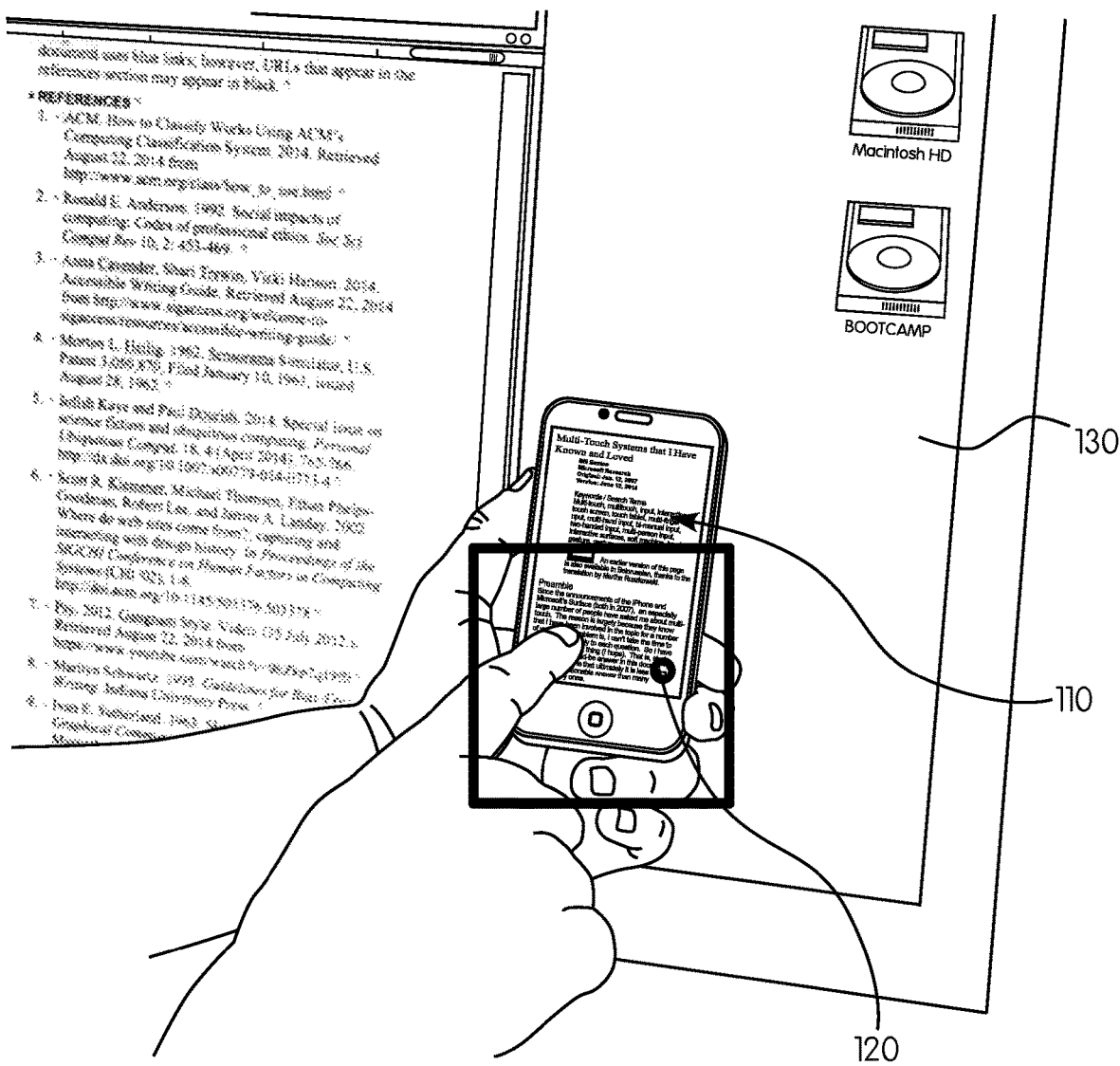
Figure 5C:
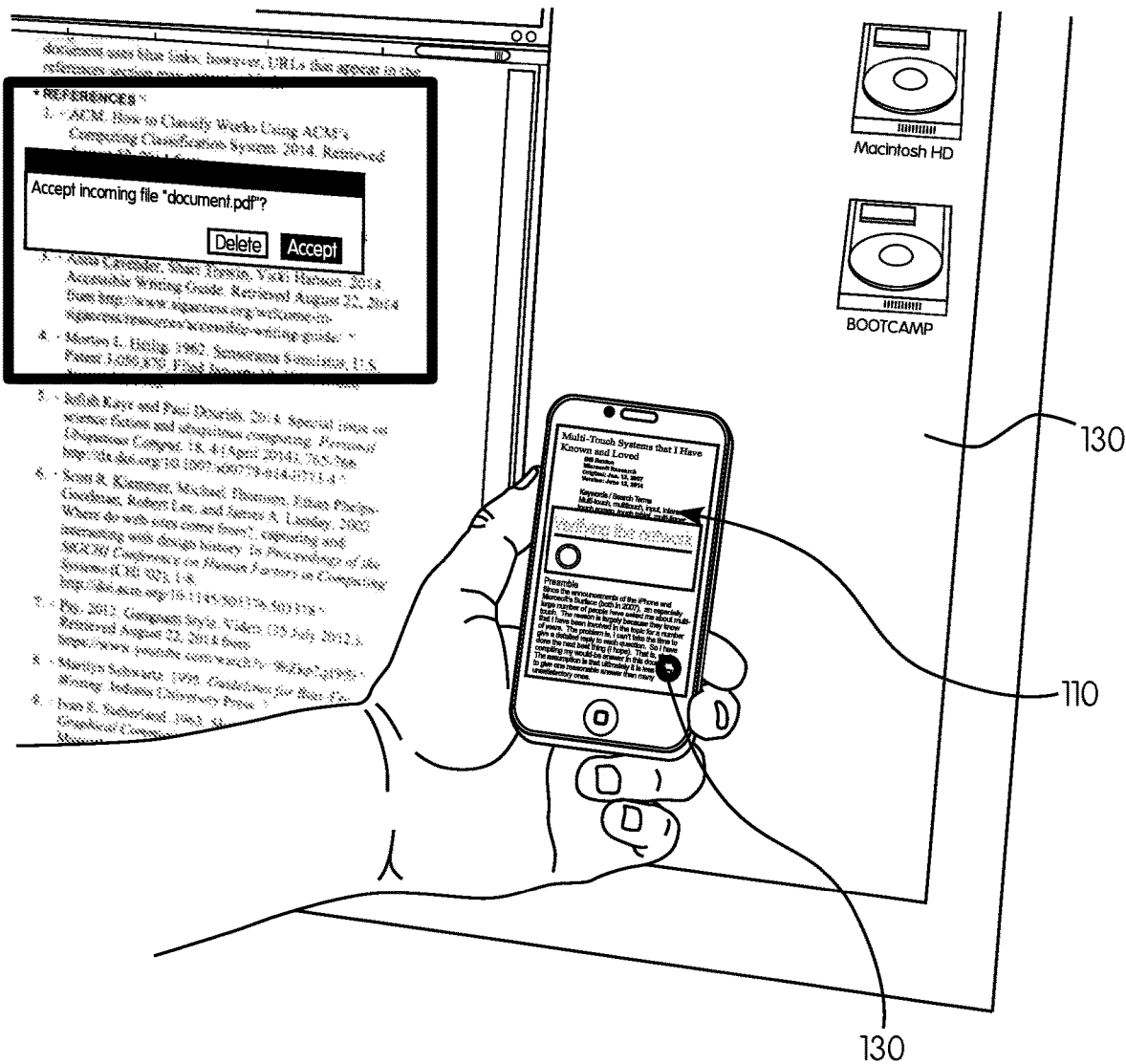
Figure 5D:
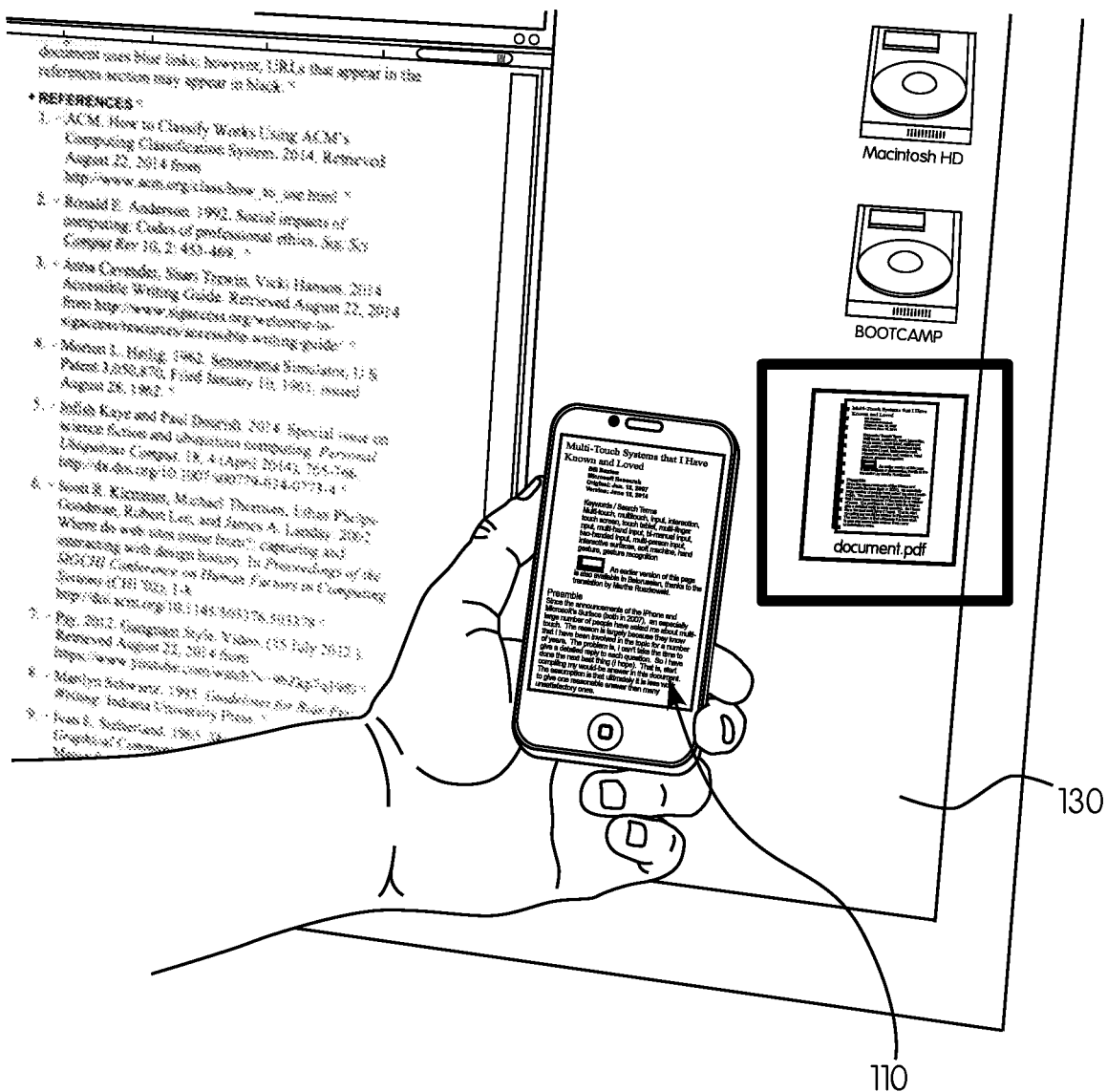

In an example embodiment, shown in FIGS. 5A-5D, a user can tap their phone to a computer monitor (i.e. the object) (FIG. 5A), which brings up a "send" charm 120 (FIG. 5B). Activating the charm 120, which can be accomplished by tapping the charm 120 (FIG. 5C), sends the current document to the computer for offline reading (FIG. 5D). The charm 120 establishes a connection with instances of an authenticated custom file transfer service running on the local network, and the user confirms the file transfer on the computer. The file transfer dialog might appear on any computer the user owns, and this action of confirming the transfer ensures the file is sent to the right device.

Figure 6A:
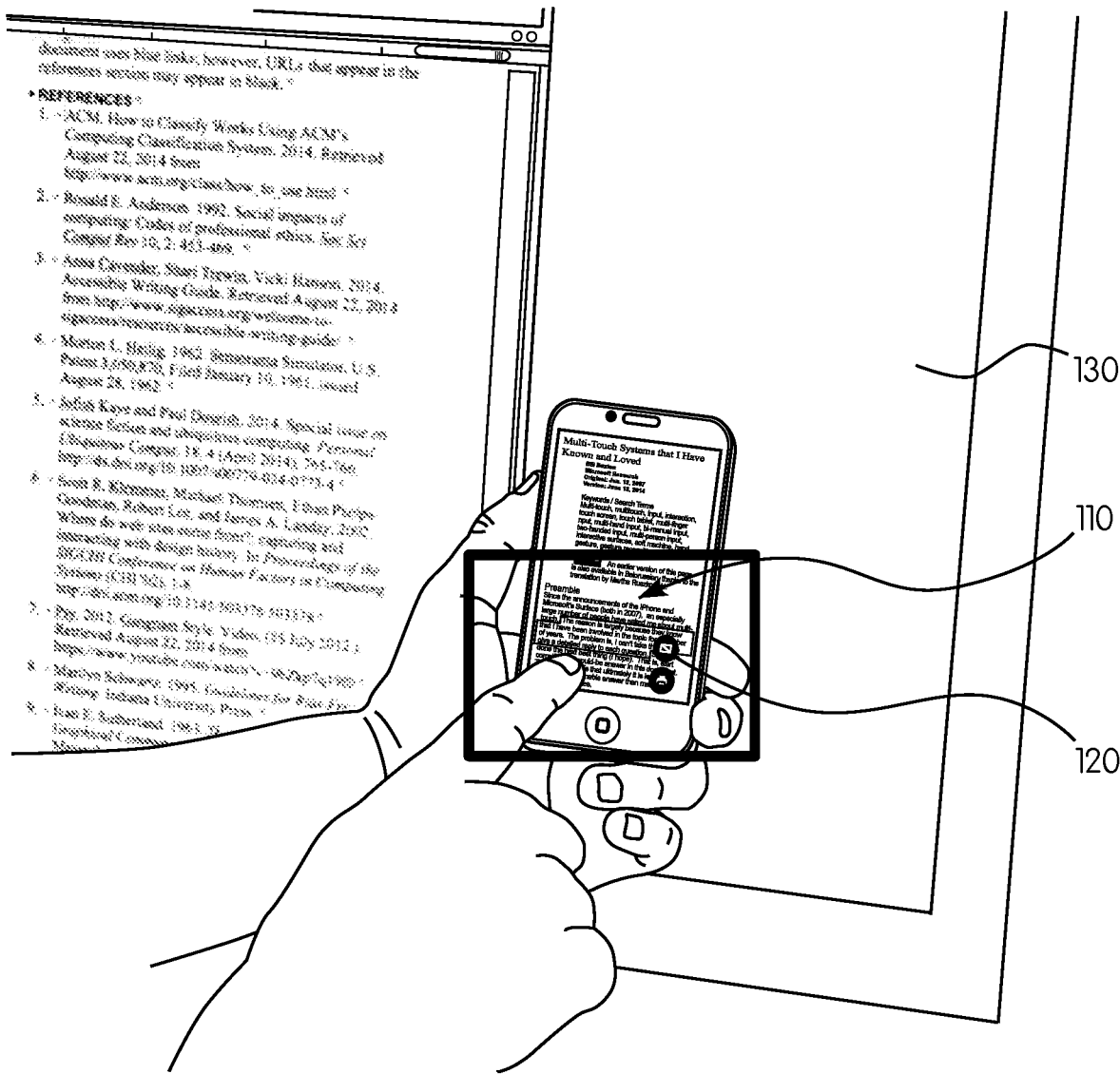
FIGS. 6A-6B show an example "Copy Text" contextual charm.
Figure 6B:
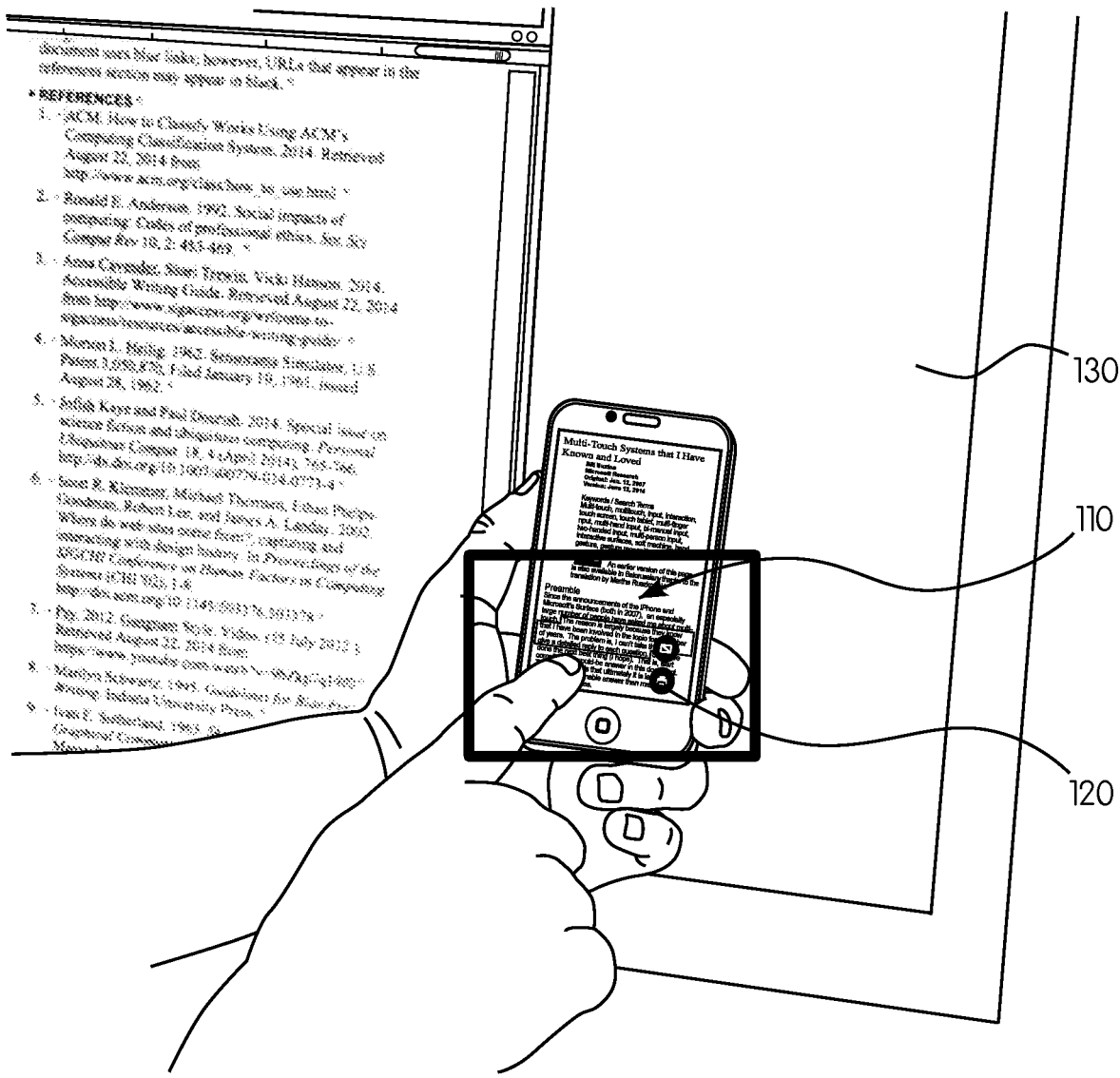

Users can also select a segment of text to obtain a second "copy" charm 120, shown in FIGS. 6A-6B, which copies the text to the computer's clipboard. This uses the same file transfer service, but instead copies the sent data to the clipboard using the Mac OS X pbcopy utility, for example. This can be used not only for text, but also media, such as PDFs and images.

Figure 7A:
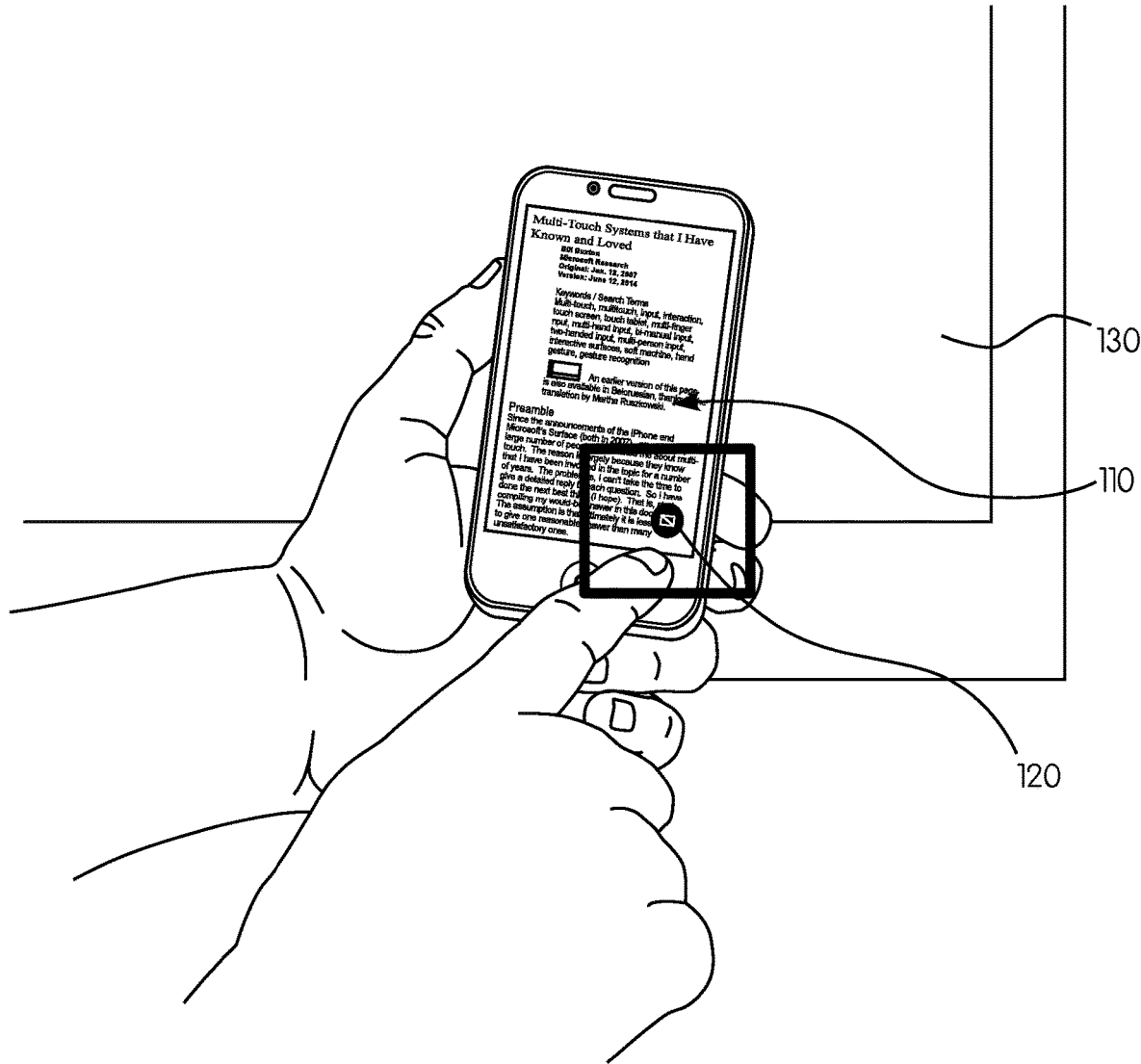
FIGS. 7A-7B show an example "Cast Video" contextual charm.
Figure 7B:
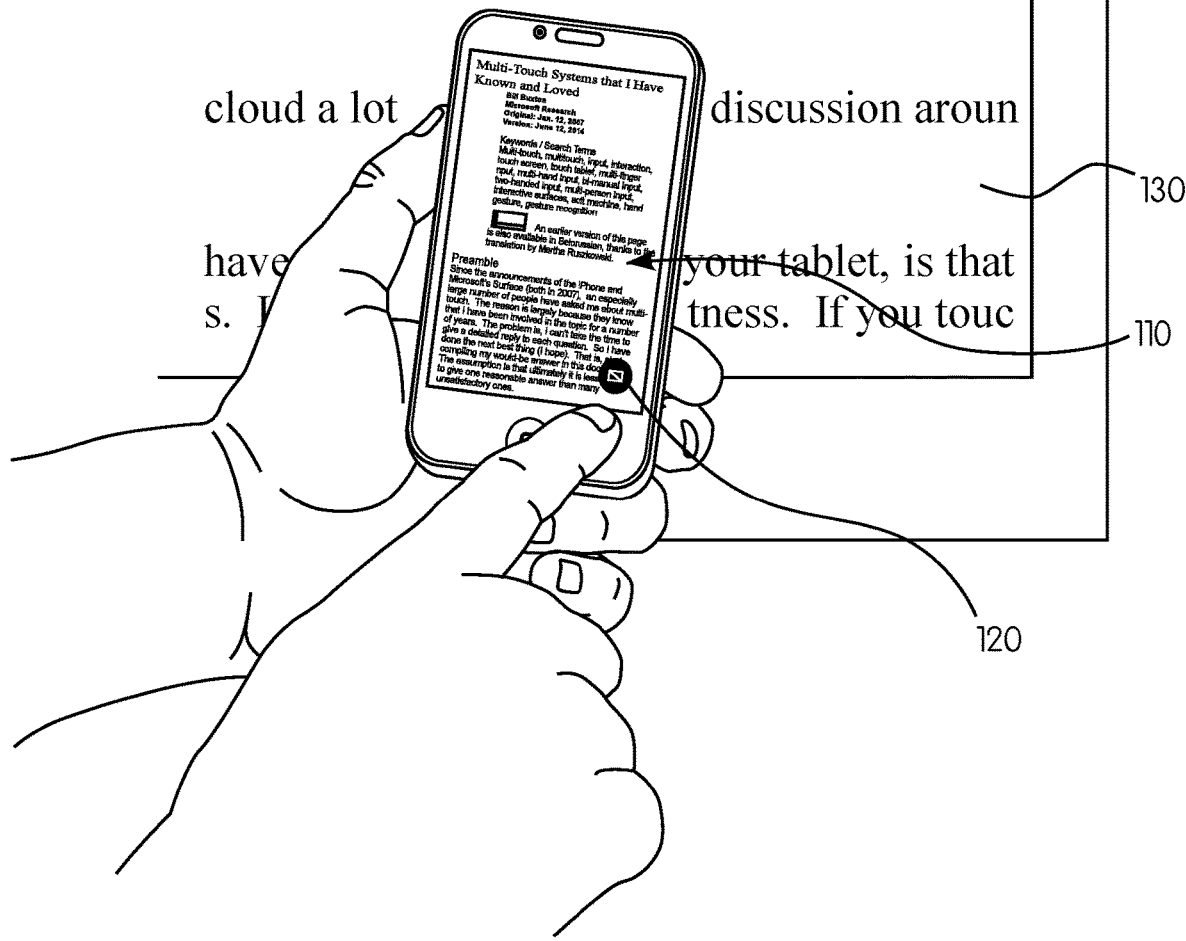

In an alternative embodiment, tapping the electronic device 110 on the TV (i.e. object) reveals a "cast" charm 120, as shown in FIGS. 7A-7B. This charm 120 can be used to automatically project a document being viewed on the electronic device 110 on the larger screen of the TV. As another example, the electronic device 110 can be touched to a Chromecast Audio device, which causes a "cast" charm 120 to appear on-screen. Tapping this charm automatically transfers the audio stream to the Chromecast. This is implemented using the Android Media-Router remote streaming API, and assumes that only the phone and Chromecast Audio have been previously paired.

Referring again to the example shown in FIG. 4, the "print" charm 120 may send the document to a print spooler, if applicable. Since multiple printers of the same type or model could be present, the specific printer touched by the electronic device 110 can be identified through its EM signature and geo-location, since similar models will have similar EM signatures. Although there are small EM signal differences that are characteristic of particular locations, these are often too unreliable for robust disambiguation. In order to differentiate between duplicate objects 130, geo-location reporting from the electronic device 110 can be used to aid in the classification of the EM signal received from an object. For example, GPS or Wi-Fi signal location data can be used to provide further detail on the identity of an object 130. Thus, in this embodiment, the location of a particular device can be registered the first time an object 130 is touched. In subsequent touch interactions, the specific device will be identified based on both the EM signal and the location data.

Figure 8:
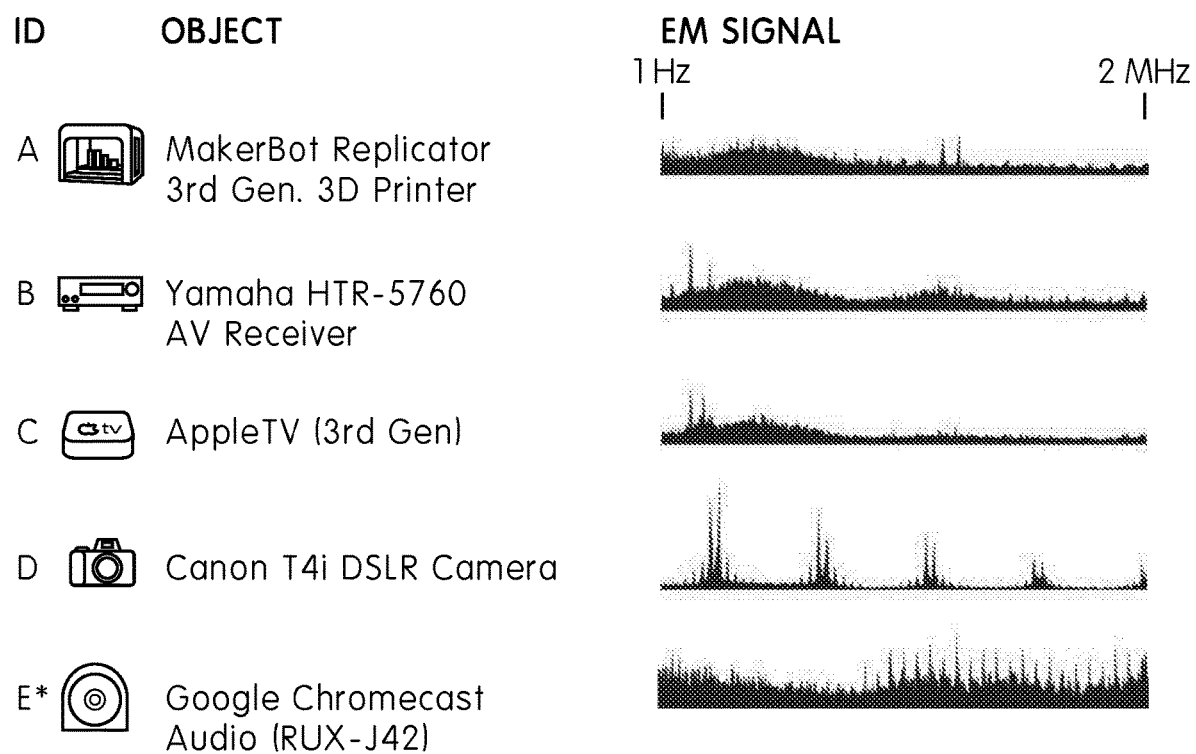
FIG. 8 shows various objects with their associated EM signature.

In an example implementation of the system and method of the present invention, seventeen (17) objects 130 that typified poor access to rich functionality were identified. FIG. 8 provides sample EM signatures for several of these objects 130. Eleven of these objects 130 have some form of connectivity, though their "smartness" varies. For example, the Apple TV is connected to WiFi and can be controlled through a cloud portal or via iOS devices. On the other hand, an HVAC system is wired and computer controlled, but not accessible for external control in the traditional IoT sense.

Also included in this example implementation are five objects 130 with no connectivity, which serve as stand-ins for future "smart" versions of themselves. For example, a Keurig B200, a basic coffee brewing machine with no IoT functionally, was included as a proxy for future smart coffee makers. Although this lack of connectivity prevents fully functional control implementations, it nonetheless allows exploration of how interactions with these devices might feel if there were to be made smart in the future.

Figure 9:
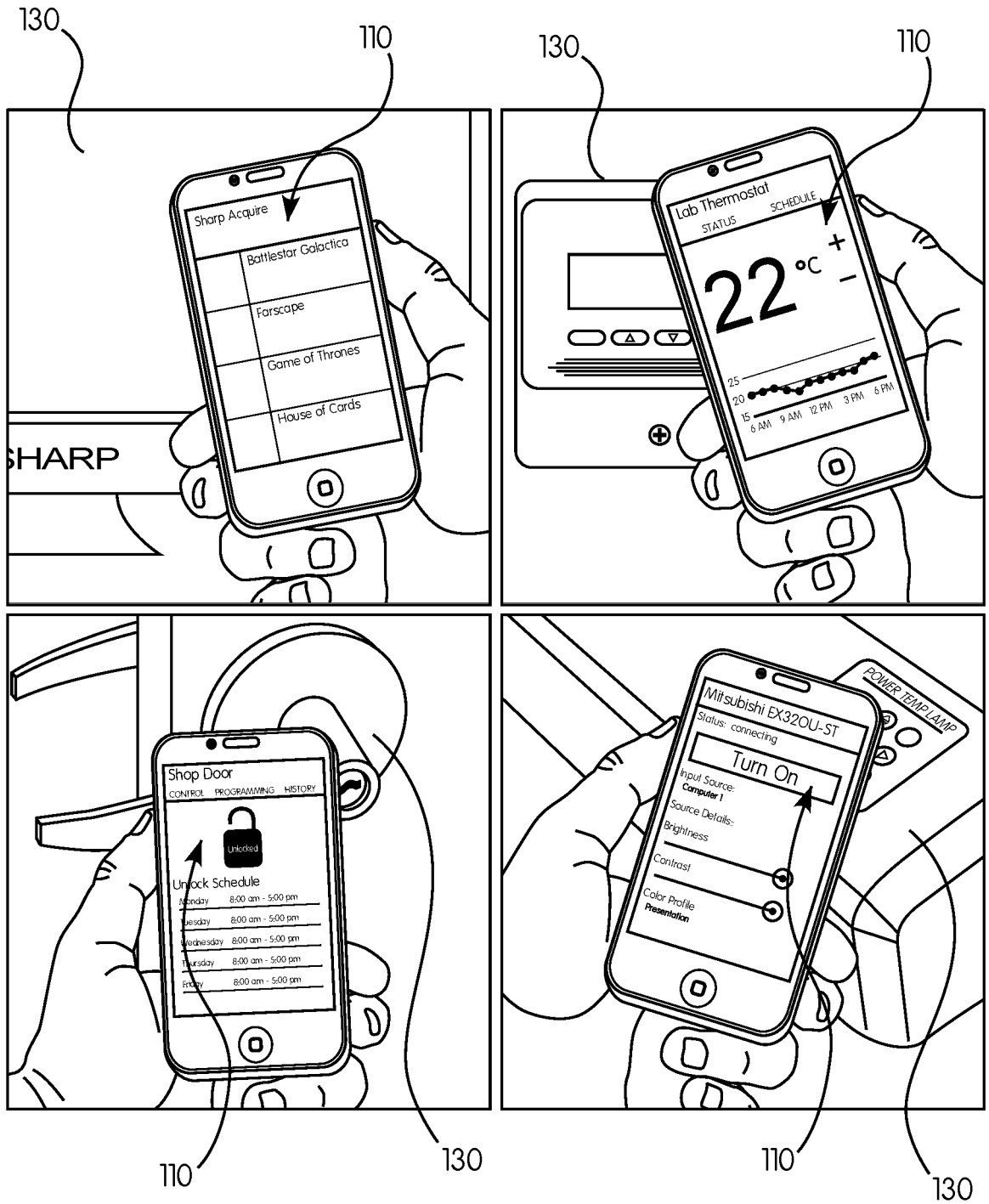
FIG. 9 shows example full-screen applications for objects including a monitor, thermostat, door lock, and projector.

Within this example implementation, three Apps. to illustrate controlling common infrastructure hardware and four Apps. to demonstrate control of common appliances were included. FIG. 9 provides illustrations of full screen Apps. used to control the objects 130.

For infrastructure hardware, for example, one of the most painful interactions is setting a heating/cooling schedule on contemporary thermostats. To alleviate the burden of this interaction, the example implementation includes a multi-pane configuration App. for a building's thermostats, which instantly launches when a phone is tapped to the thermostat. The thermostat App. is shown in the upper right-hand corner of FIG. 9. Another awkward interaction is router control, which requires remembering and typing a numerical IP address (e.g. "192.168.1.1") and a password to access the web-based configuration panel. To simplify this process, the system includes a router control application that launches when a phone touches a wireless router. The IP address to the router could be inferred automatically from the gateway address on the device's WiFi connection. The MAC address or other identifier of the phone could serve as authentication instead of a password.

With respect to smart or connected household appliances, a refrigerator App. can display the set point temperatures for the main and freezer compartments, as well as the status and mode of the icemaker. For a television set, the system can include a "remote control" App. that allows users to control the TV's input source and manage the built-in DVR functionality.

As yet another example, an App. used to control smart light bulbs, such as the Philips Hue light bulb, can be launched when the electronic device 110 is touched to any part of the metal standing lamp to trigger the full screen control App. In this particular example for the Philips light bulb, the App. connects to the Philips Hue wireless bridge device through UPnP auto-discovery, and then issues commands using the Hue's REST API to control the color and brightness of the light bulb in response to user input.

The system and method of the present invention are not limited to the objects 130 and App. provided as examples. Rather, the system and method can be applied to any object that emits an EM signal. Further, the system and method can be used for objects that do not inherently create an EM signal, but rather are passive emitters of collected EM signals.

While the disclosure thus far has discussed classification, the system requires training before recognition can occur. In one embodiment, training occurs by holding the electronic device 110 to an object's surface, thereby collecting multiple EM signature instances over a five second period. Given the speed of the system, several hundred EM signatures can be collected in a short period of time. This procedure can be repeated for each object 130 in the user's house, office, or other location. To account for potential variability from environmental conditions, a second round of data can be collected at a different time. Four rounds (2000 instances) of "no appliance", i.e., ambient background EM noise can also be collected. This data can then be used to train a classifier (using the SMO algorithm from the Weka toolkit, for example), which is deployed to the electronic device 110.

To test the accuracy of the system, ten participants were recruited (5 female, mean age 28.6, mean BMI=23.2) for an evaluation study, which took approximately 30 minutes to complete. Seventeen example objects 130 were divided into five zones: common area, conference room, kitchen, office, and living room. Participants visited these zones in a random order. Within each zone, users touched the smartphone to one object 130 at a time. Each object 130 was requested three times, and the order of requests was randomized. In total, this yielded 510 trials (10 participants×17 objects×3 repeats).

Of note, the smartphone (or electronic device 110) performed live, on-device classification (i.e., no post hoc feature engineering, kernel parameter optimization, etc.). Furthermore, there was no per-user calibration or training—a single, pre-trained classifier was used throughout the experiment and across all participants. Although a lab study, this practice more closely emulates real world deployment (where a classifier might be deployed to many devices 110 with an over-the-air update). In addition to using a classifier trained more than a week prior, we also ran our user study over a three-day period, demonstrating the temporal stability of our system.

Overall, accuracy was high. Across 10 users and 17 objects 130, the system achieved an overall accuracy of 98.8% (SD=1.7%), while many objects 130 achieved 100% accuracy. One object 130, a lamp stand with Phillips Hue light bulb, fared relatively worse (86%) than other objects 130, which is possibly due to the object 130 being highly susceptible to erratic power line noise. Nonetheless, the system of the present invention was fairly robust, and it was found to have no relationship on system accuracy across users or location.

Embodiments of the present invention include a system that enables users to simply tap their smartphone or other electronic device 110 to an object 130 to interact with it. To achieve this, the system comprises a hardware sensing configuration, including an electronic device 110 having an antenna 113, which is combined with an efficient and accurate real-time classification engine 120. A number of useful applications enabled by the system are demonstrated, including several with full functional implementations.

While the disclosure has been described in detail and with reference to specific embodiments thereof, it will be apparent to one skilled in the art that various changes and modification can be made therein without departing from the spirit and scope of the embodiments. Thus, it is intended that the present disclosure cover the modifications and variations of this disclosure provided they come within the scope of the appended claims and their equivalents.

What is claimed is:

1. A method of recognizing and interacting with an object comprising:
positioning an electronic device in proximity to an object, wherein the electronic device comprises a controller, a user interface, and an antenna receptive of electro-magnetic signals emitted from the object;
receiving an electro-magnetic signal emitted by the object using the antenna;
analyzing the electro-magnetic signal received by the antenna to recognize the object;
determining whether the object supports a contextual action,
wherein the contextual action comprises a specific action that is contextually dependent on a state of the electronic device and the object; and
interacting with the object through the user interface of the electronic device,
wherein a contextual charm is displayed on the user interface and initiated to perform the contextual action between the electronic device and the object if the contextual action is supported by the object.

2. The method of claim 1, further comprising:
initiating an application on the electronic device when the object does not support a contextual action,
wherein the application is capable of controlling the object.

3. The method of claim 1, further comprising:
receiving notification of a supported contextual action from the object.

4. The method of claim 1, further comprising:
accepting the contextual charm to perform the contextual action on the object.

5. The method of claim 1, further comprising:
matching the contextual action to an available control action on an application associated with the object.

6. The method of claim 3, further comprising:
receiving a signature electro-magnetic signal with the supported contextual action,
wherein the signature electro-magnetic signal can be used to recognize the object.

7. The method of claim 1, further comprising:
receiving location data from a location sensor on the electronic device;
using the location data in connection with the recognition of the object to identify the object specifically.

8. The method of claim 1, wherein analyzing the electro-magnetic signal received by the antenna to recognize the object comprises:
matching the received electro-magnetic signal to an electro-magnetic signal for the object.

9. The method of claim 1, wherein the contextual charm causes the object to receive an action from an application running on the electronic device.

10. The method of claim 1, wherein the contextual charm represents an item/action pair.

11. The method of claim 10, wherein the item comprises an electronic file.

12. The method of claim 1, wherein interacting with the object through the user interface of the electronic device comprises:
controlling the object by sending instructions to the object from the electronic device to perform the supported action represented by the contextual charm.

13. A system for recognizing and interacting with an object comprising:
an electronic device comprising:
an antenna for receiving an electro-magnetic signal emitted from an object in proximity to the electronic device,
a controller for analyzing the received electro-magnetic signal,
a classification engine for classifying the object based on the analyzed signal, and
a user interface,
wherein the user interface provides a means to control the object through a contextual charm displayed on the user interface,
wherein the contextual charm represents a supported action capable of being performed on the object through instruction sent by the electronic device,
wherein the supported action comprises an action that is contextually dependent on the electronic device and the object.

14. The system of claim 13, wherein the means to control the object comprises an application executed on the electronic device.

* * * * *